United States Patent
Chaffin et al.

(10) Patent No.: US 12,379,931 B2
(45) Date of Patent: Aug. 5, 2025

(54) MECHANISM FOR INSTRUCTION FUSION

(71) Applicant: Ampere Computing LLC, Santa Clara, CA (US)

(72) Inventors: Benjamin Crawford Chaffin, Portland, OR (US); Bret Toll, Hillsboro, OR (US); Jacob Daniel Morgan, Forest Grove, OR (US); Michael Spradling, Raleigh, NC (US); David Nuechterlein, Erie, CO (US)

(73) Assignee: Ampere Computing LLC, Santa Clara, CA (US)

( * ) Notice: Subject to any disclaimer, the term of this patent is extended or adjusted under 35 U.S.C. 154(b) by 40 days.

(21) Appl. No.: 18/490,640

(22) Filed: Oct. 19, 2023

(65) Prior Publication Data

US 2025/0130809 A1   Apr. 24, 2025

(51) Int. Cl.
*G06F 9/30* (2018.01)
*G06F 9/38* (2018.01)

(52) U.S. Cl.
CPC ........ *G06F 9/3818* (2013.01); *G06F 9/30181* (2013.01)

(58) Field of Classification Search
CPC ............................ G06F 9/3818; G06F 9/30181
See application file for complete search history.

(56) References Cited

U.S. PATENT DOCUMENTS

| | | | | |
|---|---|---|---|---|
| 10,671,393 | B2 * | 6/2020 | Gschwind | G06F 9/30181 |
| 2016/0246600 | A1 * | 8/2016 | Ouziel | G06F 9/30181 |
| 2020/0004550 | A1 * | 1/2020 | Thakker | G06F 9/30043 |

OTHER PUBLICATIONS

Singh et al.; Exploring Instruction Fusion Opportunities in General Purpose Processors; 2022; IEEE (Year: 2022).*
Singh (Year: 2022).*

* cited by examiner

*Primary Examiner* — Corey S Faherty
(74) *Attorney, Agent, or Firm* — Muncy, Geissler, Olds & Lowe, P.C.

(57) ABSTRACT

A compute node capable of enhanced performance and/or energy savings is proposed. The proposed compute node may check whether a last instruction of a first group—retrieved in a first decode cycle—is potentially a fusible instruction. If so, the proposed compute node may refrain from decoding the last instruction in the first decode cycle. Instead, the proposed compute node may determine if a first instruction of a second group of instructions retrieved in a second decode cycle (subsequent to the first decode cycle) is fusible with the last instruction of the first group. If so, the two instructions may be fused to a single micro-operation.

21 Claims, 3 Drawing Sheets

MECHANISM FOR INSTRUCTION FUSION

FIELD OF DISCLOSURE

This disclosure relates generally to computing nodes such as system-on-chips (SoC). More specifically, but not exclusively, to a mechanism for instruction fusion for execution on the computing nodes.

BACKGROUND

In a computing node, a processor core (also referred to as a core) of the node decodes software instructions—e.g., assembly, machine instructions-into one or more micro-ops (μops), which are what the execution portions of the core actually operate on. In some instances, two instructions can be 'fused' into a single μop, which can improve performance and/or efficiency. Typically, latency of the fused μop is less than if the two instructions were executed separately. This can improve the throughput of the instruction decoder. Also, there can be a reduction in energy and scheduling/execution resource consumption.

Normally, the instruction decoder looks at a group of instructions at one time and can only detect fusion when the two fusible instructions fall within the same group. For example, a core may look at N instructions (e.g., 5) at a time at a time and produce upto N−1 (e.g., 4) μops. However, there can be occasions in which two halves of a fusible pair of instructions can be split across groups. That is, the last instruction in one decode cycle may be fusible with a first instruction in the next decode cycle. In this instance, the two instructions are decoded separately, i.e., the fusion is missed. In this instance, the opportunity for fusion and the accompanying benefits (e.g., performance efficiency, energy saving, etc.) are lost.

Accordingly, there is a need for systems, apparatus, and methods that overcome the deficiencies of conventional devices including the methods, system and apparatus provided herein.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An exemplary compute node is disclosed. The compute node may comprise one or more cores configured to execute micro-operations (μops). The compute node may also comprise a decoder configured to, in a decode cycle, decode a group of instructions stored in an instruction queue into corresponding μops for execution by the one or more cores. The group of instructions may comprise a plurality of N instructions. The decoder may also be configured to determine, during a first decode cycle, whether a first-last instruction is potentially fusible with another instruction. The first-last instruction may be a last instruction N of a first group of instructions stored in the instruction queue. The first-last instruction may be the last to be decoded among the first group of instructions. The decoder may further be configured to retrieve, during a second decode cycle subsequent to the first decode cycle, one or more instructions from the instruction queue when it is determined that the first-last instruction is the fusible instruction. The decoder may yet be configured to determine, during the second decode cycle, whether the first-last instruction is fusible with a second instruction. The second instruction may be one of the one or more instructions retrieved during the second decode cycle. The decoder may yet further be configured to fuse the first-last instruction and the second instruction into a single μop for execution by at least one core of the one or more cores when it is determined that the first-last instruction is fusible with the second instruction.

A method of decoding a plurality of instructions for a compute node is disclosed. The compute node may comprise a decoder configured to, in a decode cycle, decode a group of instructions stored in an instruction queue into corresponding μops for execution by the one or more cores. The group of instructions may comprise a plurality of N instructions. The method may comprise determining, during a first decode cycle, whether a first-last instruction is potentially fusible with another instruction. The first-last instruction may be a last instruction N of a first group of instructions stored in the instruction queue. The first-last instruction may be the last to be decoded among the first group of instructions. The method may also comprise retrieving, during a second decode cycle subsequent to the first decode cycle, one or more instructions from the instruction queue when it is determined that the first-last instruction is the fusible instruction. The method may further comprise determining, during the second decode cycle, whether the first-last instruction is fusible with a second instruction. The second instruction may be one of the one or more instructions retrieved during the second decode cycle. The method may yet comprise fusing the first-last instruction and the second instruction into a single μop for execution by at least one core of the one or more cores when it is determined that the first-last instruction is fusible with the second instruction.

Another exemplary compute node is disclosed. The compute node may comprise means for determining, during a first decode cycle, whether a first-last instruction is potentially fusible with another instruction. The first-last instruction may be a last instruction N of a first group of instructions stored in the instruction queue. The first-last instruction may be the last to be decoded among the first group of instructions. The compute node may comprise means for retrieving, during a second decode cycle subsequent to the first decode cycle, one or more instructions from the instruction queue when it is determined that the first-last instruction is the fusible instruction. The compute node may comprise means for determining, during the second decode cycle, whether the first-last instruction is fusible with a second instruction. The second instruction may be one of the one or more instructions retrieved during the second decode cycle. The compute node may comprise means for fusing the first-last instruction and the second instruction into a single μop for execution by at least one core of the one or more cores when it is determined that the first-last instruction is fusible with the second instruction.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

DETAILED DESCRIPTION

Figure 1:
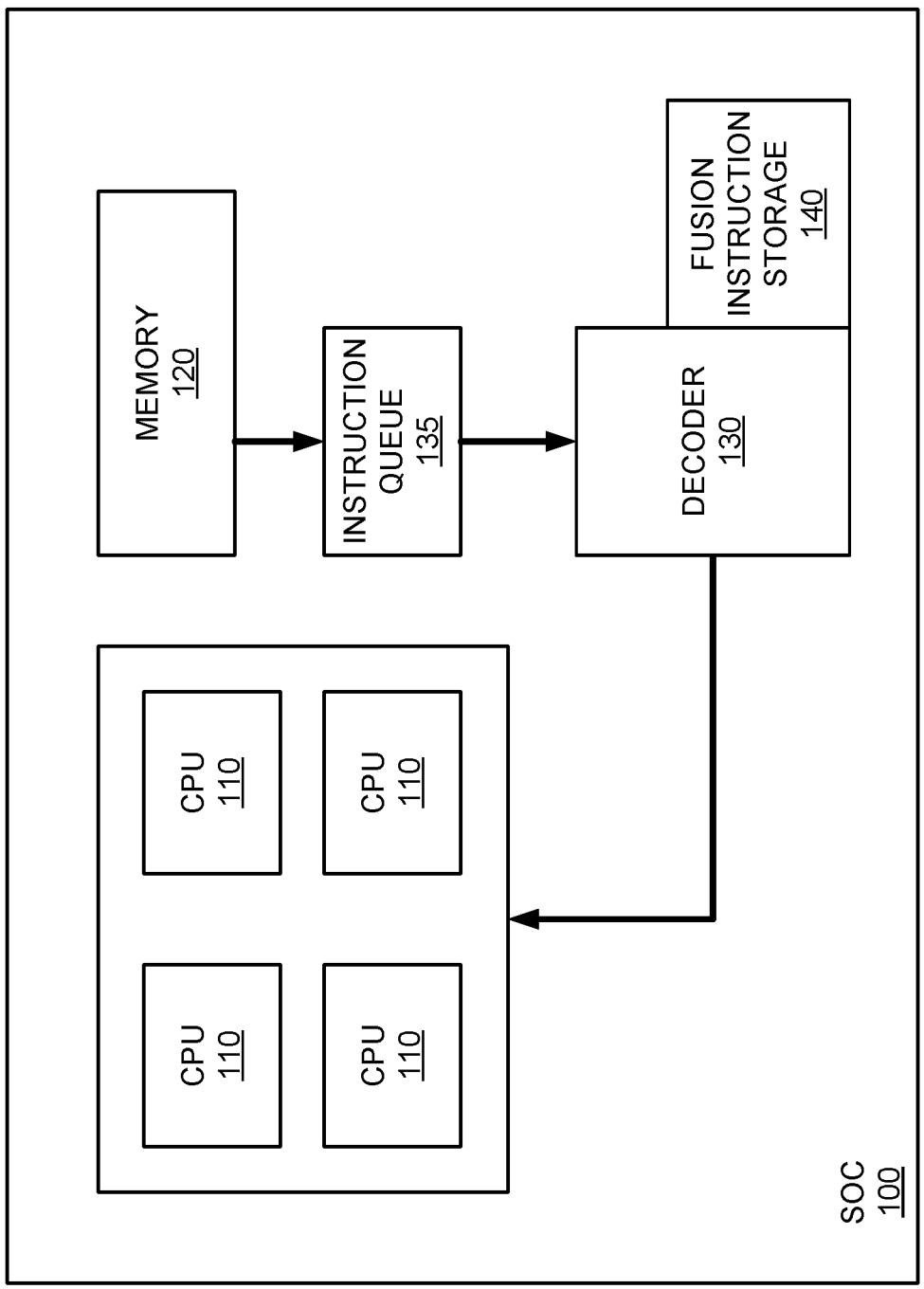
FIG. 1 illustrates an example of a compute node in accordance with one or more aspects of the disclosure.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

As indicated above, a conventional instruction decoder of a computing node looks at a group of instructions (e.g., 5 instructions) at one time, and can only detect fusion when the two fusible instructions fall within the same group. However, if the two halves of a fusible instruction pair are split across groups (e.g., the last instruction decoded in one cycle and the first instruction in the next cycle), then the fusion opportunity is missed and the fusible instructions are decoded separately. As a result, accompanying benefits (e.g., performance efficiency, energy saving, etc.) of instruction fusion—or simply fusion—are lost.

To address such issues and other disadvantages of conventional instruction fetching and decoding, a mechanism is proposed to fuse a pair of instructions even if the fusible pair of instructions occur in different groups. That is, if one fusible instruction occurs at the end of one decode group, and it is very likely to fuse with the next instruction (i.e., the first instruction of the next decode group), the decoding of the one fusible instruction may be delayed until the next cycle.

As an example, Advanced Encryption Standard (AES) encryption is performed with a pair of instructions (AESE, AESMC). These instructions are very frequently used together. That is, AESMC instruction nearly always follows AESE instruction. Conventionally, these instructions would be separately decoded and executed if they were parts of different groups of instructions that are fetched and decoded.

However, with the proposed mechanism, if AESE is the last instruction of one decode group, it is NOT individually decoded (even though it is possible to do so) in that decode cycle. Instead, if the first instruction in the next decode group is AESMC, the two instructions are fused together into one µop for execution. Thus, by delaying the decoding of the one instruction of the fusible pair of instructions, power and/or efficiency can be improved when the one instruction is fused with the other instruction of the fusible pair in the next decode group.

This suggests the following. In an aspect, the decoding of a current instruction should be delayed (until the next decode cycle) if it is highly likely that the next instruction is fusible with the current instruction. This is because if it turns out that the next instruction is not fusible with the current instruction, then there is a penalty of a wasted decode slot. Thus, to lessen the likelihood of a wasted decode slot, it is desirable to delay decoding when it is highly likely that the current instruction is fusible.

FIG. 1 illustrates an example of a compute node 100 in accordance with one or more aspects of the disclosure. The compute node 100 may be a system-on-chip (SoC). The compute node 100 may comprise one or more computing cores (or simply "cores") 110. The cores 110 may be any circuitry capable of executing µops.

The compute node 100 may also comprise a memory 120 in which machine instructions are stored. The memory 120 may be a buffer, a cache, random access memory (RAM), etc. Machine instructions may be instructions that result from compiling an application written in a higher level (e.g., human readable) programming language such Python, C, C++, Java, hypertext markup language (HTML), etc. Machine instructions may include assembly instructions, ISA (instruction set architecture) instructions, etc. For simplicity, the term "instruction" may be viewed as an machine instruction unless explicitly indicated otherwise.

Note that the memory 120 is not strictly required. Here, the memory 120 is illustrated as an entity that feeds the instruction queue 135 with instructions during the decode cycles (further explained below). However, the entity that feeds the instruction queue 135 can be external to the compute node 100. It is only necessary that there be an entity—within or external to the compute node 100—that can be the source of instructions. This entity—whether it be the memory 120 or external to the compute node—may feed the instruction queue 135 whenever there are empty slots.

The compute node 100 may further comprise a decoder 130 configured to decode the instructions (e.g., stored in the instruction queue 135) into µops for execution by the one or more cores 110. That is, for each instruction, the decoder 130 may decode the instruction into corresponding one or more µops for execution by the one or more cores 110. If there are any two or more instructions that are fusible with each other, the decoder 130 may fuse the fusible instructions into a single µop for execution by the one or more cores 110.

More generally, the decoder 130 may decode a group of instructions at a time, a duration of which may be referred to as a decode cycle. The decode cycle may comprise one clock cycle or multiple clock cycles. The group of instructions may be a plurality of instructions stored in an instruction queue 135. For example, during a first decode cycle, the decoder 130 may fetch or otherwise retrieve instructions of the group from the instruction queue 135 stored as a first group of instructions. The first group of instructions may include a plurality of instructions for decoding and executing. That is, the instruction queue 135 may include a plurality of N instructions for decoding during the first decode cycle, N≥2. It may be assumed that the instruction queue 135 has at least N slots to store the N instructions.

The decoder 130 may decode each of the N instructions of the first group into their corresponding one or more µops for execution by the one or more cores 110. The decoding may take place during the first decode cycle. In this instance, it may be assumed that the intended order of decoding among the first group of instructions is from the first-first instruction (e.g., instruction (n=1)) to the first-last instruction (e.g., instruction (n=N). If any two instructions of the first group of instructions are fusible with each other, then the decoder 130 may fuse the two instructions into a single µop.

In an aspect, as each instruction is decoded, it may be "consumed". That is, the slot of the instruction queue 135 in which the instruction was stored may be freed to store another instruction. However, if the first-last instruction is NOT decoded because it is deemed to be potentially fusible, then it is NOT consumed during that first decode cycle. This implies that the last slot N is NOT free to be filled with another instruction. In an aspect, an upstream instruction source entity—whether it be the memory 120 or some external entity—may fill a slot of the instruction queue 135 as soon as it be becomes free so that during the next decode cycle, the slot has an instruction to be decoded.

After decoding the first group of instructions in the first decode cycle, a second group of instructions may be retrieved from the instruction queue 135 in a second decode cycle, which is subsequent to the first decode cycle. During the second decode cycle, a second group of instructions (comprising multiple instructions) stored in the instruction queue 135 may be decoded in a manner similar to the way in which the first group of instructions are decoded.

But in some instances, fusible instructions may straddle first and second groups of instructions. For example, it is possible that one instruction of a fusible pair is in the first group and another instruction of the same fusible pair is in the second group. Conventionally, when this situation occurs, each instruction of the fusible pair is decoded separately—e.g., one in the first decode cycle and another in the second decode cycle—into different µops and executed. That is, each instruction is consumed separately.

However, with the proposed compute node 100, the decoder 130 may refrain from decoding the one instruction in the first group of instructions during the first decode cycle. Instead, the decoder 130 may check whether the other instruction of the fusion pair is in the second group of instructions retrieved in the second decode cycle. If so, then the decoder 130 may fuse during the second decode cycle the fusible pair of instructions—one instruction from the first group and the other instruction from the second group—as a single µop for execution by the one or more cores 110. There can be many several fusible instructions. AESE and AESMC is one particular example. Another example is a comparison of two numbers followed by a conditional branch.

The compute node 100 may yet further include a fusion instruction storage 140 populated with one or more fusible instruction pairs. In an aspect, the list of the fusible instruction pairs may be statically determined. In another aspect, the fusible instruction pairs may be populated dynamically. Each fusible instruction pair may comprise a pair of instructions that are fusible with each other. Also, for each fusible instruction pair, there may be an associated probability of the pair of instructions being ordered next to each other, e.g., in an application.

Figure 2:
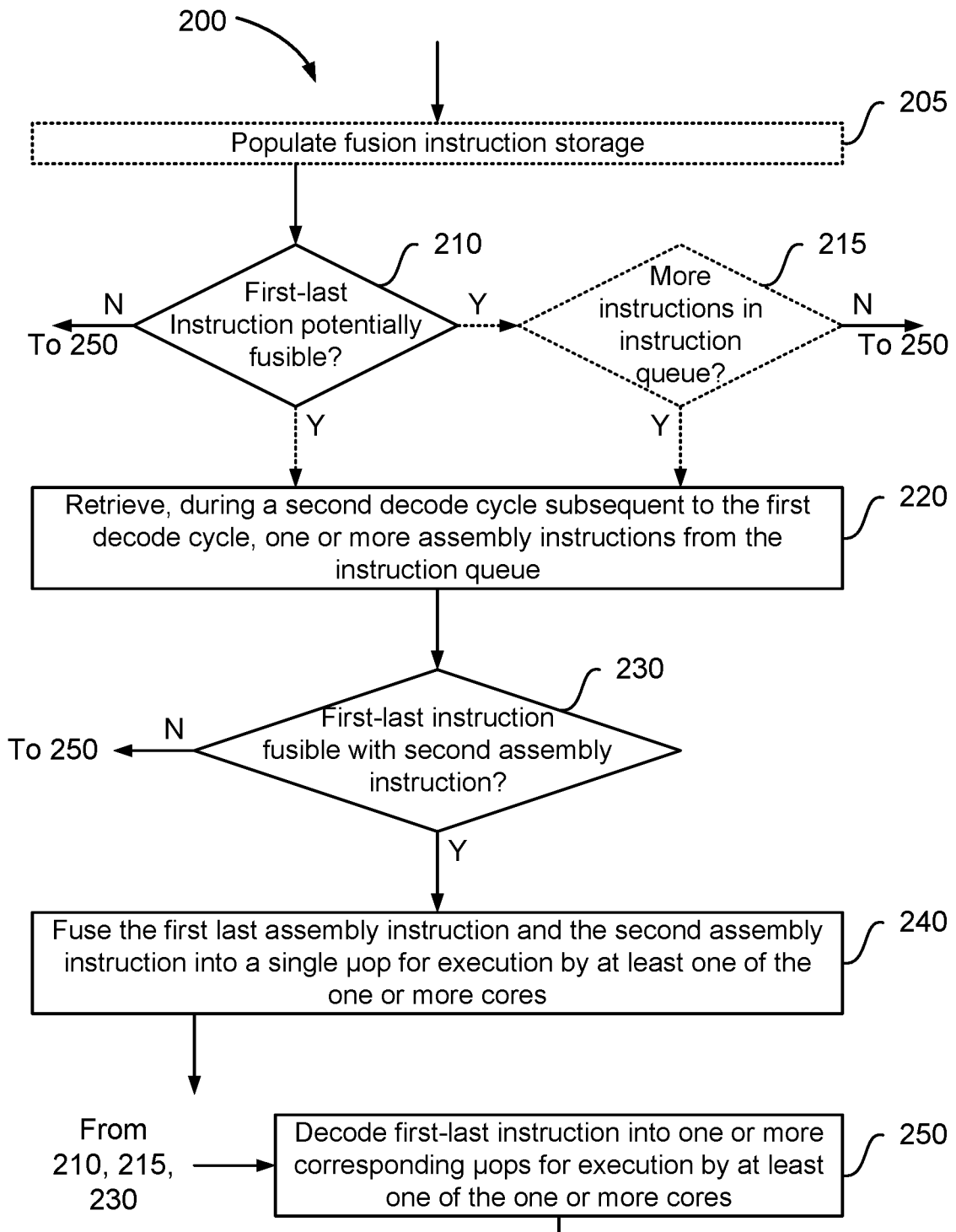
FIGS. 2-3 illustrate flow charts of an example method of decoding a plurality of instructions for a compute node in accordance with one or more aspects of the disclosure.

FIG. 2 illustrates a flow chart of an example method 200 of decoding a plurality of instructions for a compute node, such as the compute node 100, in accordance with one or more aspects of the disclosure. In an aspect, the method 200 may be performed by a decoder, such as the decoder 130.

Recall that the decoder 130 may be configured to retrieve or otherwise fetch, during a decode cycle, a group of instructions from the instruction queue 135. The group of instructions in the instruction queue 135 may be decoded into corresponding µops for execution by the one or more cores 110. The group of instructions may comprise a plurality of N instructions, N≥2.

As seen in FIG. 2, in block 205, the decoder 130 may populate the fusion instruction storage 140 with one or more fusible instruction pairs from a data source external to the compute node 100. For example, the one or more fusible instruction pairs may be generated or otherwise determined based on observed behavior of the current application running on the compute node 100. Alternatively or in addition thereto, the populated one or more fusible instruction pairs may be determined based on analysis of the compiled instructions.

In an aspect, block 205 is dashed to indicate that it is optional. That is, fusion instruction storage 140 may be prepopulated with a list of fusible instruction pairs and thus block 205 need not be performed. In another aspect, block 205 may be performed even if the fusion instruction storage 140 is not empty. For example, the fusion instruction storage 140 may have been prepopulated and/or block 205 may have been performed previously. When block 205 is performed, a previous list of fusible instruction pairs may be overwritten with a new list of fusible instruction pairs. Alternatively, new list of fusible instruction pairs may be added to the previous list.

In block 210, the decoder 130 may determine, during a first decode cycle, whether a first-last instruction is potentially fusible with another instruction. In this instance, the first-last instruction may be a last instruction N of a first group of instructions stored in the instruction queue 135. The first-last instruction may be the last instruction to be decoded among the first group of instructions. Details of the operations of block 210 will be discussed in more detail later on with respect to FIG. 3.

If the first-last instruction is determined to be potentially fusible with another instruction (one 'Y' branch from block 210), the method 200 may proceed to block 220 in which the decoder 130 may retrieve, during a second decode cycle, one or more instructions from the instruction queue 135. The second decode cycle may be subsequent (e.g., immediately subsequent) to the first decode cycle. In an aspect, N−1 instructions may be retrieved during the second decode cycle.

If it is determined that the first-last instruction is not potentially fusible ('N' branch from block 210), the method 200 may proceed to block 250. In block 250, the decoder 130 may decode the first-last instruction into one or more corresponding µops for execution by at least one core 110 of the one or more cores 110. When block 250 is reached from block 210, the first-last instruction may be decoded during the first decode cycle.

It should be noted that when the instruction is decoded, it is consumed, i.e., the corresponding slot in the instruction queue 135 becomes available to be filled with another instruction—e.g., by the memory 120 and/or an external entity. The first-last instruction is NOT decoded during the first decode cycle. Thus, the first-last instruction remains in the last slot N to be decoded during the second decode cycle.

Alternatively, if the first-last instruction is determined to be potentially fusible with another instruction (other 'Y' branch from block 210), the method 200 may proceed to block 215. In block 215, the decoder 130 may determine whether there are more instructions for retrieval remaining in the instruction queue 135. If so ('Y' branch from block 215), the method 200 may proceed to block 220.

On the other hand, if it is determined that there are no more instructions for retrieval in the instruction queue 135

('N' branch from block 215), the method 200 may proceed to block 250 in which the first-last instruction may be decoded into the one or more corresponding µops for execution. When block 250 is reached from block 220, the first-last instruction may be decoded during the first decode cycle. By decoding the first-last instruction in this instance, a potential "wait forever" situation may be avoided.

Subsequent to block 220, the decoder 130 in block 230 may determine, during the second decode cycle, whether the first-last instruction is fusible with a second instruction. In an aspect, the second instruction may be one of the one or more instructions retrieved during the second decode cycle. In a particular aspect, the second instruction may be the instruction that is to be decoded and/or executed first among the one or more instructions retrieved during the second decode cycle. The first-last instruction and the second instruction may be determined to be fusible if they form a fusible instruction pair.

If it is determined that the first-last instruction is fusible with the second instruction ('Y' branch from block 230), the method 200 may proceed to block 240. In block 240, the decoder 130 may fuse the first-last instruction and the second instruction into a single µop for execution by at least one core 110 of the one or more cores 110. The fusing may take place during the second decode cycle.

On the other hand, if it is determined that the first-last instruction is not fusible with the second instruction ('N' branch from block 230), the method 200 may proceed to block 250 in which the first-last instruction may be decoded into the one or more corresponding µops for execution. When block 250 is reached from block 230, the first-last instruction may be decoded during the second decode cycle. Note that the second instruction may also be decoded during the second decode cycle as well.

Figure 3:
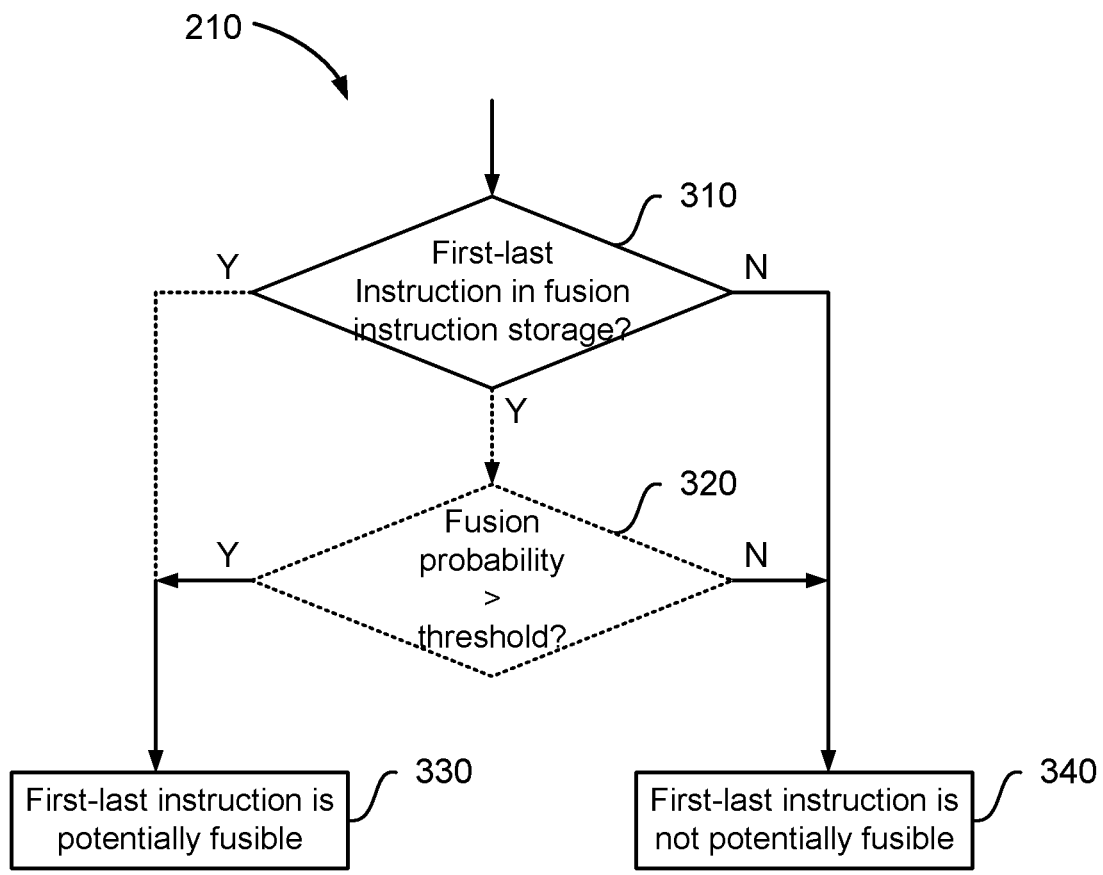

FIG. 3 illustrates a flow chart of an example process for implementing block 210, i.e., of determining whether the first-last instruction is potentially fusible. As seen in FIG. 3, the decoder 130 may determine whether the first-last instruction is potentially fusible based on the fusion instruction storage 140.

In block 310, the decoder 130 may determine whether the first-last instruction is in the fusion instruction storage 140. In particular, the decoder 130 may determine whether first-last instruction matches an instruction of at least one fusible instruction pair of the one or more fusible instruction pairs stored in the fusion instruction storage 140.

If so (one 'Y' branch from block 310), the method 200 may proceed to block 330 where it is determined that the first-last instruction is potentially fusible. When block 330 is reached from block 310, then the presence of the first-last instruction within the fusion instruction storage 140 is sufficient to determine that the first-last instruction is potentially fusible.

Alternatively, if it is determined that the first-last instruction is in the fusion instruction storage 140 (other 'Y' branch from block 310), then the method 200 may then proceed to block 320 where the decoder 130 may determine the probability of the pair of instructions being ordered next to each other is greater than a minimum threshold.

If so ('Y' branch from block 320), the method 200 may proceed to block 330 where it is determined that the first-last instruction is potentially fusible. When block 330 is reached from block 320, then the probability of the instructions of the fusible pair being consecutively ordered is also taken into account.

Note that block 320 is optional. That is, block 320 may be performed, but need not be performed.

If it is determined that the first-last instruction is not in the fusion instruction storage 140 ('N' branch from block 310) or that the probability is not greater than the minimum threshold ('N' branch from block 320), then in block 340, the decoder 130 may determine that the first-last instruction is not potentially fusible.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Aspects of the present disclosure are illustrated in the description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or one or more claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A compute node, comprising:
   one or more cores configured to execute micro-operations (μops); and
   a decoder configured to, in a decode cycle, decode a group of instructions stored in an instruction queue into corresponding μops for execution by the one or more cores, the group of instructions comprising a plurality of N instructions,
   wherein the decoder is further configured to:
      determine, during a first decode cycle, whether a first-last instruction is potentially fusible with another instruction, the first-last instruction being a last instruction N of a first group of instructions stored in the instruction queue, the first-last instruction being last to be decoded among the first group of instructions;

retrieve, during a second decode cycle subsequent to the first decode cycle, one or more instructions from the instruction queue when it is determined that the first-last instruction is the fusible instruction;

determine, during the second decode cycle, whether the first-last instruction is fusible with a second instruction, the second instruction being one of the one or more instructions retrieved during the second decode cycle; and fuse the first-last instruction and the second instruction into a single μop for execution by at least one core of the one or more cores when it is determined that the first-last instruction is fusible with the second instruction.

2. The compute node of claim 1, wherein the first-last instruction is not decoded during the first decode cycle when it is determined that the first-last instruction is potentially fusible.

3. The compute node of claim 1, wherein the second instruction is an instruction to be decoded first among the one or more instructions retrieved during the second decode cycle.

4. The compute node of claim 1, wherein N−1 instructions are retrieved during the second decode cycle.

5. The compute node of claim 1, wherein the decoder is further configured to decode, during the first decode cycle, the first-last instruction into one or more corresponding μops for execution by at least one core of the one or more cores when it is determined that the first-last instruction is not potentially fusible.

6. The compute node of claim 1, wherein the decoder is further configured to decode, during the second decode cycle, the first-last instruction into one or more corresponding μops for execution by at least one core of the one or more cores when it is determined that the first-last instruction is not fusible with the second instruction.

7. The compute node of claim 1, further comprising:
a fusion instruction storage configured to store one or more fusible instruction pairs, each fusible instruction pair comprising a pair of instructions that are fusible with each other,
wherein the decoder is configured to determine whether the first-last instruction is potentially fusible based on the fusion instruction storage.

8. The compute node of claim 7, wherein determining whether the first-last instruction is potentially fusible, the decoder is configured to:
determine that the first-last instruction is potentially fusible when the first-last instruction matches an instruction of at least one fusible instruction pair of the one or more fusible instruction pairs.

9. The compute node of claim 7,
wherein the fusion instruction storage further comprises, for each fusible instruction pair of the one or more fusible instruction pairs, a probability of the pair of instructions being ordered next to each other, and
wherein determining whether the first-last instruction is potentially fusible, the decoder is configured to:
determine that the first-last instruction is potentially fusible when the first-last instruction is included as an instruction of at least one fusible instruction pair of the one or more fusible instruction pairs, and the probability of the pair assembly of instructions being ordered next to each other is greater than a minimum threshold.

10. The compute node of claim 7, wherein the compute node is configured to populate the fusion instruction storage with the one or more fusible instruction pairs from a data source external to the compute node.

11. A method of decoding a plurality of instructions for a compute node, the compute node comprising a decoder configured to, in a decode cycle, decode a group of instructions stored in an instruction queue into corresponding μops for execution by the one or more cores, the group of instructions comprising a plurality of N instructions, the method comprising:
determining, by the decoder during a first decode cycle, whether a first-last instruction is potentially fusible with another instruction, the first-last instruction being a last instruction N of a first group of instructions stored in the instruction queue, the first-last instruction being last to be decoded among the first group of instructions;
retrieving, by the decoder during a second decode cycle subsequent to the first decode cycle, one or more instructions from the instruction queue when it is determined that the first-last instruction is the fusible instruction;
determining, by the decoder during the second decode cycle, whether the first-last instruction is fusible with a second instruction, the second instruction being one of the one or more instructions retrieved during the second decode cycle; and
fusing, by the decoder, the first-last instruction and the second instruction into a single μop for execution by at least one core of the one or more cores when it is determined that the first-last instruction is fusible with the second instruction.

12. The method of claim 11, wherein the first-last instruction is not decoded during the first decode cycle when it is determined that the first-last instruction is potentially fusible.

13. The method of claim 11, wherein the second instruction is an instruction to be decoded first among the one or more instructions retrieved during the second decode cycle.

14. The method of claim 11, wherein N−1 instructions are retrieved during the second decode cycle.

15. The method of claim 11, further comprising:
decoding, by the decoder during the first decode cycle, the first-last instruction into one or more corresponding μops for execution by at least one core of the one or more cores when it is determined that the first-last instruction is not potentially fusible.

16. The method of claim 11, further comprising:
decoding, by the decoder during the second decode cycle, the first-last instruction into one or more corresponding μops for execution by at least one core of the one or more cores when it is determined that the first-last instruction is not fusible with the second instruction.

17. The method of claim 11,
wherein the compute node further comprises a fusion instruction storage configured to store one or more fusible instruction pairs, each fusible instruction pair comprising a pair of instructions that are fusible with each other, and
wherein determining whether the first-last instruction is potentially fusible comprises determining whether the first-last instruction is potentially fusible based on the fusion instruction storage.

18. The method of claim 17, wherein determining whether the first-last instruction is potentially fusible with the another instruction, comprises:
  determining that the first-last instruction is potentially fusible when the first-last instruction matches an instruction of at least one fusible instruction pair of the one or more fusible instruction pairs.

19. The method of claim 17,
  wherein the fusion instruction storage further comprises, for each fusible instruction pair of the one or more fusible instruction pairs, a probability of the pair of instructions being ordered next to each other, and
  wherein determining whether the first-last instruction is fusible with the another instruction comprises:
    determining that the first-last instruction is potentially fusible when the first-last instruction is included as an instruction of at least one fusible instruction pair of the one or more fusible instruction pairs, and the probability of the pair of instructions being ordered next to each other is greater than a minimum threshold.

20. The method of claim 17, further comprising:
  populating the fusion instruction storage with the one or more fusible instruction pairs from a data source external to the compute node.

21. A compute node, comprising:
  means for determining, during a first decode cycle, whether a first-last instruction is potentially fusible with another instruction, the first-last instruction being a last instruction N of a first group of instructions stored in the instruction queue, the first-last instruction being last to be decoded among the first group of instructions;
  means for retrieving, during a second decode cycle subsequent to the first decode cycle, one or more instructions from the instruction queue when it is determined that the first-last instruction is the fusible instruction;
  means for determining, during the second decode cycle, whether the first-last instruction is fusible with a second instruction, the second instruction being one of the one or more instructions retrieved during the second decode cycle; and
  means for fusing the first-last instruction and the second instruction into a single µop for execution by at least one core of the one or more cores when it is determined that the first-last instruction is fusible with the second instruction.

* * * * *